United States Patent Office 3,185,710
Patented May 25, 1965

3,185,710
RESOLUTION OF PANTOLACTONE AND PHENYLETHYLAMINE
Morris Dunkel, Kew Gardens, N.Y., Ira Loter, East Paterson, N.J., and Howard C. Klein, Brooklyn, N.Y., assignors to Nopco Chemical Company, Newark, N.J., a corporation of New Jersey
No Drawing. Filed Sept. 6, 1961, Ser. No. 136,196
10 Claims. (Cl. 260—343.6)

The present invention relates to new resolution processes as well as to the intermediates obtained in carrying out said processes. More particularly, the present invention relates to the resolution of racemic $\alpha$-hydroxy-$\beta,\beta$-dimethyl-$\gamma$-butyrolactone using optically active 1-$\alpha$-phenylethylamine as the resolving agent to obtain D (—)-$\alpha$-hydroxy-$\beta,\beta$-dimethyl-$\gamma$-butyrolactone, also referred to as 1-pantolactone or D (—)-panolactone. Also, this invention relates to the resolution of racemic $\alpha$-phenylethylamine using D (—)-pantolactone as the resolving agent to obtain 1-$\alpha$-phenylethylamine.

Heretofore, racemic pantolactone has been resolved with 1-brucine as the resolving agent. See, for instance, British Patent No. 605,444. However, brucine is an expensive material and at times difficultly available. Also, the handling of brucine is difficult because this material has toxic properties. It is also known to resolve racemic $\alpha$-phenylethylamine by elaborate procedures involving treatment with tartaric acid and fractional crystalization. See Organic Syntheses, volume II, pages 506 to 509. It is also known to resolve racemic $\alpha$-phenylethylamine with amino acids and to resolve amino acids with 1-$\alpha$-phenylethylamine. See J. Am. Chem. Soc. 73: 5782–5783 (1951).

Accordingly, it is an object of the present invention to obtain in an improved and more economical manner D (—)-pantolactone from racemic pantolactone. Another object is to obtain 1-$\alpha$-phenylethylamine from racemic $\alpha$-phenylethylamine in an improved and more direct manner. A further object is to prepare novel intermediates of pantolactone and $\alpha$-phenylethylamine. Further objects will become apparent from the detailed description given hereinafter. It is intended however that the detailed description and the specific examples do not limit this invention, but merely indicate the preferred embodiments since various changes and modifications within the scope of the invention will become apparent to those skilled in the art.

The above as well as other objects have been unexpectedly achieved in the following manner. Racemic pantolactone is reacted with 1-$\alpha$-phenyl-ethylamine. There are formed as reaction products the amide of 1-$\alpha$-phenylethylamine and D (—)-pantolactone and the amide of 1-$\alpha$-phenylethylamine and L (+)-pantolactone in admixture with each other. Because of the difference in solubilities of these two amides in many organic solvents and water, the former can be precipitated from solution while the latter remains in solution. In this manner, the amide of 1-$\alpha$-phenylethylamine and D (—)-pantolactone is recovered from which D (—)-pantolactone can be obtained by treatment with a base to cleave the amide followed by relactonization with an acid.

In the other embodiment of our invention, racemic $\alpha$-phenylethylamine is reacted with D (—)-pantolactone. There are formed as reaction products the amides of 1-phenylethylamine and D (—)-pantolactone and the amide of d-$\alpha$-phenylethylamine and D (—)-pantolactone in admixture with each other. Because of the difference in solubilities of these two amides in many organic solvents and water, the former can be precipitated from solution while the latter remains in solution. In this manner, the amide of D (—)-pantolactone and 1-$\alpha$-phenylethylamine is recovered from which 1-$\alpha$-phenylethylamine can be obtained by cleaving the amide with a base.

Thus, according to this invention, improved procedures are provided for obtaining D (—)-pantolactone and 1-$\alpha$-phenylethylamine directly from their respective racemic mixtures. Indeed, it was most surprising to discover that when resolving racemic pantolactone with 1-$\alpha$-phenylethylamine and when resolving racemic $\alpha$-phenylethylamine with D (—)-pantolactone, that the amide of 1-$\alpha$-phenylethylamine and D (—)-pantolactone is insoluble in many organic solvents and water and precipitates therefrom upon cooling whereas the diastereoisomers are soluble.

As pointed out previously, it is known to resolve racemic pantolactone with 1-brucine. It is also known to resolve racemic $\alpha$-phenylethylamine with tartaric acid and to resolve amino acids with 1-$\alpha$-phenylethylamine. In these prior art resolution procedures, complexes of the lactone and salts of the amine are formed. However, the resolutions described herein are achieved through the formation of novel amide intermediates of the materials to be resolved. Thus, it can be seen that the resolution procedures described herein are different from those set forth in the prior art.

RESOLUTION OF RACEMIC PANTOLACTONE WITH 1-$\alpha$-PHENYLETHYLAMINE

When carrying out the resolution of racemic pantolactone with 1-$\alpha$-phenylethylamine, the two materials are admixed together and heated at temperatures of from about 50° C. to about 187° C. for a period of time of from about one to about 100 hours. Of course, the lower temperature, the longer the reaction time will be. The reaction can be carried out under atmospheric or superatmospheric pressures. Optionally, a solvent can be used and when used, the temperature of reaction is usually the reflux temperature of the system. However, the formation of the amide intermediate proceeds best in the absence of a solvent and with the use of higher temperatures. When carrying out the reaction between the lactone and amine, the following proportions are utilized. From about 0.5 to 2.0 mols of amine are reacted with each mole of racemic pantolactone. However, it has been found that the reaction rate is increased by using an excess of the amine. Hence, it is preferred to use from about 1.1 to 1.5 mols of amine per mole of lactone. When solvents are used, it is only necessary that the solvent be a liquid organic material which is inert with respect to the lactone, the amine and the amide. The amount of solvent, if used, is not critical. Generally speaking, from about one to 50 parts of solvent per part of lactone are utilized. Examples of useful solvents are water, lower alcohols, such as methanol, ethanol, isopropanol; aromatic hydrocarbons such as benzene, toluene, xylene; ethers such as diethylether, tetrahydrofuran, dibutylether, anisole and Cellosolves such as butyl Cellosolve and Cellosolve; aliphatic hydrocarbons such as hexane, petroleum ethers, kerosenes, V. M. & P. naphthas, etc. It should be understood that these specific solvents are merely exemplary and not limiting.

When the reaction is carried out in a solvent, upon completion thereof, the reaction mixture is cooled down to a temperature of from about —10° C. to +75° C. whereupon the amide which is the reaction product of D (—)-pantolactone and 1-$\alpha$-phenylethylamine precipitates from solution. Note that the amide, to be recovered, need not be insoluble in the solvent in which the reaction is carried out since the solvent can be removed after the reaction is completed and replaced by an appropriate solvent in which the desired amide is insoluble. If, however, no solvent was used, then upon completion of the reaction, a solvent which can be the same as those enumerated above is added and then the reaction mixture cooled down to permit the amide which is the reaction product of D (—)-pantolactone and 1-α-phenylethylamine to precipitate out of solution.

After the amide has been recovered, it is treated with a base whereupon it is broken up to form the D (+)-pantoate salt of the lactone and 1-α-phenylethylamine. The pantoate salt is then relactonized with an acid thus yielding D (—)-pantolactone. The amide can be cleaved in various ways. For example, it can be treated with an aqueous solution of a base such as sodium hydroxide, potassium hydroxide, barium hydroxide or the like accompanied by heating at from about room temperature to about 100° C. for from about 0.5 to 24 hours. The cleaving of amides per se is known and any conventional procedure can be used herein. In the case of relactonization of the pantoate salt, this can be accomplished by treating the pantoate salt with an aqueous solution of an acid such as hydrochloric acid or sulfuric acid at temperatures of from about room temperature to 100° C. for from about 0.5 to about 24 hours. It should be understood, however, that the relactonization of the pantoate salt per se does not form a part of the present invention and any convenient means available in the art can be used.

RESOLUTION OF RACEMIC α-PHENYLETHYLAMINE WITH D (—)-PANTOLACTONE

When resolving racemic α-phenylethylamine, a mixture of racemic α-phenylethylamine and D (—)-pantolactone is prepared and heated at temperatures of from about 50° C. to about 187° C. for about one to about 100 hours. Of course, the lower the temperature, the longer the reaction time will be. The reaction can be carried out under atmospheric or super-atmospheric pressures. Optionally, a solvent can be used and when used, the temperature of reaction is usually the reflux temperature of the system. However, the formation of the amide intermediate proceeds best in the absence of a solvent and with the use of higher temperatures. When carrying out the reaction between the lactone and amine, the following proportions are utilized. From about 0.5 to 2.0 mols of lactone are reacted with each mole of racemic amine. However, it has been found that the reaction rate is increased by using an excess of the amine. Hence, it is preferred to use from about 1.1 to 1.5 mols of amine per mole of lactone. When solvents are used, it is only necessary that the solvent be a liquid organic material inert with respect to the lactone, amine and amide. The amount of solvent is not critical. Generally speaking, from about one to 50 parts of solvent per part of lactone are utilized. Useful solvents are water, lower alcohols such as methanol, ethanol, isopropanol; aromatic hydrocarbons such as benzene, toluene, xylene; ethers such as diethylether, tetrahydrofuran, dibutylether, anisole and Cellosolves such as butyl Cellosolve and Cellosolve; aliphatic hydrocarbons such as hexane, petroleum ethers, kerosenes, V.M. & P. naphthas, etc. It should be understood that these specific solvents are merely exemplary and not limiting.

When the reaction is carried out in a solvent, upon completion thereof, the reaction mixture is cooled to a temperature of from about —10 to +75° C. whereupon the amide which is the reaction product of D (—)-pantolactone and 1-α-phenylethylamine precipitates from solution. Note that the amide to be recovered need not be insoluble in the solvent in which the reaction is carried out since the solvent can be removed after the reaction is completed and replaced by an appropriate solvent in which the desired amide is insoluble. If, however, no solvent was used, then upon completion of the reaction a solvent such as one of those previously indicated is added and the reaction mixture then cooled down to permit the amide to precipitate out of solution.

After the amide, which is the reaction product of D (—)-pantolactone and 1-α-phenylethylamine has been recovered, it is treated with a base whereupon, it is broken up to form 1-α-phenylethylamine and the D (+)pantoate salt of the lactone. The amine is then removed by extraction e.g. with ether, while the pantoate salt can be relactonized and recovered. The cleavage of the amide can be carried out in the manner previously indicated with regard to the resolution of racemic pantolactone.

It should be understood that the amide intermediates, i.e., the N (α-phenylethyl)-α,γ-dihydroxy-β,β-dimethylbutyramides, formed herein are themselves new compositions of matter. The amide which is the reaction product of D (—)-pantolactone and 1-α-phenylethylamine, obtained by resolving racemic pantolactone with 1-α-phenylethylamine, is of especial value since the D (—)-pantolactone which is recovered therefrom is useful in the preparation of physiologically active pantothenic acid, salts thereof and pantothenol. Also, as a result of the resolution of racemic pantolactone, there is also formed the amide of L (+)-pantolactone and 1-α-phenylethylamine which remains in the solvent. In the resolution of racemic α-phenylethylamine using D (—)-pantolactone, the amide of D (—)-pantolactone and 1-α-phenylethylamine is obtained. The 1-α-phenylethylamine obtained therefrom is useful as a resolving agent. There is also found the amide of d-α-phenylethylamine and D (—)-pantolactone which remains in the solvent. The amide of L (+)-pantolactone and 1-α-phenylethylamine and the amide of D (—)-pantolactone and d-α-phenylethylamine which are soluble in the previously described solvents, can themselves be treated with alkali in order to recover the corresponding amine and the corresponding pantoate salt. The pantoate salt obtained from the amide of L (+)-pantolactone and 1-α-phenylethylamine can be relactonized and racemized to form racemic pantolactone and the amine reused as a resolving agent while the pantoate salt obtained from the amide of D (—)-pantolactone and d-α-phenylethylamine can be relactonized and used in preparing pantothenic acid or its salts. Also, by utilizing the preceding reaction conditions, the amide of d-α-phenylethylamine and L (+)-pantolactone can be prepared. This amide can be cleaved and the resulting pantoate salt relactonized to form L (+)-lactone which can be racemized to racemic pantolactone.

For a fuller understanding of the nature and objects of this invention, reference may be made to the following examples which are given merely to illustrate the invention and are not to be construed in a limiting sense.

*Example I.—Resolution of racemic pantolactone*

A mixture of 67.5 grams (0.5 mol) of dl-pantolactone (96.2% pure) and 66.5 grams (0.55 mol) of 1-α-phenylethylamine having $[\alpha]_D^{25}=-30.5$ (conc.=1% in methanol) was heated on a steam bath for five hours at 95° C. to 100° C. After five hours, the reaction was 95% complete. Upon cooling, 100 cc. of toluene was added to the reaction mixture. The temperature was lowered to 5° C. and stirring was carried out for two hours at this temperature. 58.0 grams of dry solids, viz., the amide of D (—)-pantolactone and 1-α-phenylethylamine, having a melting point range of 125° C. to 127° C. were recovered. The solids were then added to 465 cc. of boiling toluene and after cooling to room temperature, 51.2 grams of solids melting at 129° C. to 131.5° C. were recovered. The solids were recrystallized again from boiling toluene and cooled to room temperature. In this manner, 47.2 grams of solids melting at 129.5° C. to 133° C. were recovered. The $[\alpha]_D^{25}$ of the material was —49.4 (conc.=1% methanol). The yield of amide was 75.8% of theory based upon the available D (—)-pantolactone in the racemate.

The amide was cleaved as follows. The amide was added to a solution of 8.25 grams of sodium hydroxide and 10 cc. of water and refluxed for one hour. Upon cooling, the upper layer which contained 1-α-phenylethylamine was extracted with diethyl ether. The remaining portion of the solution which was originally the lower aqueous layer contained D (+) sodium pantoate. It was acidified by adding hydrochloric acid and then refluxed for four hours. This was then neutralized to a pH of 6.5 with ammonium hydroxide. Upon extraction with isopropyl acetate, 21.0 grams of D (—)-pantolactone having $[\alpha]_D^{25} = -41.8$ was recovered. The lactone was crystallized from 10 cc. of hot methyl isobutyl ketone and 10 cc. hexane. The yield of D (—)-pantolactone was 17 grams and the $[\alpha]_D^{25} = -50.0$. The overall yield of D (—)-pantolactone was 52.5% based on the amount of D (—)-pantolactone present in the racemate.

*Example II.—Resolution of racemic α-phenylethylamine*

A mixture of 390 grams (3 mols) of D (—)-pantolactone and 385.8 grams (3.2 mols) of dl-α-phenylethylamine was heated on a steam bath with stirring at 95° C. to 100° C. for 23 hours. At this time the reaction was 94% complete. Thereafter, 750 cc. of toluene were added and the reaction mixture stirred in an ice bath for two hours. It was then chilled overnight at 5° C. A precipitate was formed which was the amide of 1-α-phenylethylamine and D (—)-pantolactone. The yield amounted to 311 grams of amide which melted at 130° C. to 134° C. It was recrystallized from 935 cc. of toluene. A yield of 291 grams melting at 133.5° C. to 136° C. was recovered leaving an $[\alpha]_D^{25} = -46.7$ (1% in methanol).

The amide was cleaved in the following manner. The amide and 51.0 grams (1.27 mols) of sodium hydroxide in 300 cc. of water were refluxed for 2.5 hours. The amine which was 1-α-phenylethylamine was extracted with ether and dried over sodium sulfate. The ether was then removed and the amine distilled at 83° C. to 86° C. under 21 mm. pressure. A yield of 128.5 grams of 1-α-phenylethylamine was recovered. It had $[\alpha]_D^{25} = -28.4$ (conc.=1% in methanol). The yield was 71.2% of theory based upon the amount of D (—)-pantolactone used.

*Example III*

A solution of 6.5 grams (0.05 mole) of D (—)-pantolactone ($[\alpha]_D^{25} = -49.8$) in 25 cc. methanol and 6.0 grams (0.05 mole) of 1-α-phenylethylamine ($[\alpha]_D^{25} = -39.7$) was refluxed for 27 hours and then concentrated to dryness. The residue was treated with 5 cc. of diethyl ether and chilled at —10° C. The yield was 7.8 grams of white solids melting at 132.5° C. to 135° C. having a $[\alpha]_D^{25} = -46$. This amounted to 62% of theory.

*Example IV*

A solution of 6.5 grams (0.05 mole) of L (+)-pantolactone ($[\alpha]_D^{25} = +49.3$) in 25 cc. methanol and 6.0 grams (0.05 mole) of 1-α-phenylethylamine ($[\alpha]_D^{25} = -39.7$) was refluxed 5.5 hours and a sample removed. Anhydrous titration of the solution indicated 71% unreacted amine which meant that the reaction was only 29% complete. After 23 hours, another sample was removed and titration showed 60.5% completion of the reaction. A sample removed after 27 hours showed no further change. Upon working this up, a crystalline amide having a melting point of 65° C. to 68° C. and $[\alpha]_D^{25} = -112.4$ was obtained.

*Example V*

This example illustrates the presence of solvents during amide formation.

(A) A solution of 24.2 grams (0.2 mole) of dl-α-phenylethylamine and 26.0 grams (0.2 mole) of 1-pantolactone in 64 cc. of iso-propanol was refluxed for 16.5 hours. At this point, a sample was titrated indicating 72% completion of reaction. After 23.5 hours, reaction was 80% complete. The solution was concentrated to dryness, slurried with diethyl ether, and filtered. The yield was 14.8 grams. The solids were crystallized from a mixture of 265 cc. $H_2O$ and 30 cc. MeOH at reflux. The yield was 12.6 grams (50.2% of theory) of white needles melting at 133.5° C. to 135.5° C. $[\alpha]_D^{25} = -46.0$.

(B) The procedure of part A was repeated except that refluxing for 24 hours in 50 cc. methyl Cellosolve was carried out instead. The yield of amide was 11.0 grams (43.8% of theory).

*Example VI*

A solution of 12.1 grams (0.1 mole) of dl-α-phenylethylamine, 13.0 grams (0.1 mole) of D (—)-pantolactone and 25 cc. toluene was refluxed 24 hours and then chilled at —10° C. The yield was 7.0 grams (56% theory) of the amide of 1-pantolactone and 1-α-phenylethylamine.

*Example VII*

12.1 grams (0.1 mole) of dl-α-phenylethylamine and 13.0 grams (0.1 mole) of D (—)-pantolactone was heated at 90° C. in the absence of solvent. After 4 hours, the reaction was 76.7% complete as determined by anhydrous titration of unreacted amine. After 70 hours the reaction was 90.3% complete.

*Example VIII*

This example illustrates the use of excess amine.

13.0 grams (0.1 mole) of 1-pantolactone and 13.3 grams (0.11 mole) of dl-α-phenylethylamine was heated 5 hours at 98° C. to 100° C. Anhydrous titration indicated 94.7% completion of reaction. The reaction mixture was chilled with 25 cc. of toluene at 5° C. The yield was 9.0 grams of amide melting at 127° C. to 131° C. Crystallization from 27 cc. of toluene at reflux and cooling to room temperature gave 8.89 grams of amide melting at 132° C. to 135° C.

*Example IX*

26.0 grams (0.2 mole) of D (—)-pantolactone and 24.2 grams (0.2 mole) of dl-α-phenylethylamine was heated to 178° C. over a one hour period. The reaction was 67.4% complete. The reaction was slowly cooled to 125° C. and then maintained at this temperature for one hour. The total time to reach this point was 3 hours. The anhydrous titration of unreacted amine indicated a 76.4% completion of the reaction. After an additional hour at 125° C., the reaction was 80.4% complete.

*Example X*

(A) 12.1 grams (0.1 mole) of dl-α-phenylethylamine, 13.0 grams (0.1 mole) of 1-pantolactone and 50 cc. of toluene were charged into an Aminco bomb and heated at 85° C. to 115° C. for 5 hours and 25 minutes with maximum pressure of 28 p.s.i.g. Anhydrous titration of unreacted amine indicated 75% completion of reaction.

(B) The procedure of part (A) was repeated with methanol at 90° C. to 120° C. for 5.5 hours, with a maximum pressure of 130 p.s.i.g. The reaction was 71.5% complete.

(C) The procedure of part A was repeated with benzene at 85° C. to 120° C. for 5 hours with a maximum pressure of 58 p.s.i.g. The reaction was 73.9% complete.

Having thus described our invention, what we claim as new and desire to secure by Letters Patent is:

1. A process for obtaining D (—)-α-hydroxy-β,β-dimethyl-γ-butyrolactone from racemic α-hydroxy-β,β-dimethyl-γ-butyrolactone which comprises the steps of bringing into contact with each other racemic α-hydroxy-β,β-dimethyl-γ-butyrolactone and 1-α-phenylethylamine, recovering from the resulting reaction mixture the amide of 1-α-phenylethylamine and D (—)-α-hydroxy-β,β-dimethyl-γ-butyrolactone, cleaving said amide and recovering D (—)-α-hydroxy-β,β-dimethyl-γ-butyrolactone.

2. The process of claim 1 wherein said racemic α-hydroxy-β,β-dimethyl-γ-butyrolactone and 1-α-phenylethylamine are brought together at temperatures of from about 50° C. to about 187° C.

3. The process of claim 1 wherein said racemic α-hydroxy-$\beta,\beta$-dimethyl-$\gamma$-butyrolactone and 1-$\alpha$-phenylethylamine are brought together at temperatures of from about 50° C. to about 187° C. for from about 1 to about 100 hours.

4. The process of claim 1 wherein said racemic $\alpha$-hydroxy-$\beta,\beta$-dimethyl-$\gamma$-butyrolactone and 1-$\alpha$-phenylethylamine are brought together at temperatures of from about 50° C. to about 187° C., there being present from about 0.5 to about 2.0 mols of 1-$\alpha$-phenylethylamine per mol of said racemic $\alpha$-hydroxy-$\beta,\beta$-dimethyl-$\gamma$-butyrolactone.

5. The process of claim 1 wherein said racemic $\alpha$-hydroxy-$\beta,\beta$-dimethyl-$\gamma$-butyrolactone and 1-$\alpha$-phenylethylamine are brought together at temperatures of from about 50° C. to about 187° C. in the presence of an inert organic solvent.

6. A process for obtaining 1-$\alpha$-phenylethylamine from racemic $\alpha$-phenylethylamine which comprises the steps of bringing into contact with each other racemic $\alpha$-phenylethylamine and D (—)-$\alpha$-hydroxy-$\beta,\beta$-dimethyl-$\gamma$-butyrolactone, recovering from the resulting reaction mixture the amide of 1-$\alpha$-phenylethylamine and D (—)-$\alpha$-hydroxy-$\beta,\beta$-dimethyl-$\gamma$-butyrolactone, cleaving said amide and recovering 1-$\alpha$-phenylethylamine.

7. The process of claim 6 wherein said racemic $\alpha$-phenylethylamine and D (—)-$\alpha$-hydroxy-$\beta,\beta$-dimethyl-$\gamma$-butyrolactone are brought together at temperatures of from about 50° C. to about 187° C.

8. The process of claim 6 wherein said racemic $\alpha$-phenylethylamine and D (—)-$\alpha$-hydroxy-$\beta,\beta$-dimethyl-$\gamma$-butyrolactone are brought together at temperatures of from about 50° C. to about 187° C. for from about 1 to about 100 hours.

9. The process of claim 6 wherein said racemic $\alpha$-phenylethylamine and D (—)-$\alpha$-hydroxy-$\beta,\beta$-dimethyl-$\gamma$-butyrolactone are brought together at temperatures of from about 50° C. to about 187° C., there being present from about 0.5 to about 2.0 mols of D (—)-pantolactone per mol of racemic $\alpha$-phenylethylamine.

10. The process of claim 2 wherein said racemic $\alpha$-phenylethylamine and D (—)-$\alpha$-hydroxy-$\beta,\beta$-dimethyl-$\gamma$-butyrolactone are brought together at temperatures of from about 50° C. to about 187° C. for from about one to about 100 hours in the presence of an inert organic solvent.

References Cited by the Examiner
UNITED STATES PATENTS

| | | | |
|---|---|---|---|
| 2,623,070 | 12/52 | Janssen | 260—561 |
| 2,805,219 | 9/57 | Kagan et al. | 260—343.6 |
| 2,967,869 | 1/61 | Beckmann et al. | 260—343.6 |
| 2,976,298 | 3/61 | Klein et al. | 260—343 |
| 3,024,282 | 3/62 | Parris | 260—562 |
| 3,024,720 | 3/62 | Paabo | 260—562 |

OTHER REFERENCES

Fieser et al.: Advanced Organic Chemistry, Reinhold Pub. Corp., New York (1961), pages 85–89.

Huisgen et al.: Chemical Abstracts, vol. 51 (1957), pages 14602–14603.

IRVING MARCUS, *Primary Examiner.*

NICHOLAS S. RIZZO, WALTER A. MODANCE,
*Examiners.*